(12) United States Patent
Malkin et al.

(10) Patent No.: US 8,631,119 B2
(45) Date of Patent: Jan. 14, 2014

(54) INTERRUPTIBILITY AWARENESS SERVICE

(75) Inventors: Peter K. Malkin, Ardsley, NY (US);
Jacquelyn A. Martino, Cold Spring, NY (US)

(73) Assignee: International Business Machines Corporation, Armonk, NY (US)

(*) Notice: Subject to any disclaimer, the term of this patent is extended or adjusted under 35 U.S.C. 154(b) by 910 days.

(21) Appl. No.: 12/730,608

(22) Filed: Mar. 24, 2010

(65) Prior Publication Data
US 2011/0238815 A1    Sep. 29, 2011

(51) Int. Cl.
*G06F 15/173* (2006.01)

(52) U.S. Cl.
USPC ............ 709/224; 709/203; 715/758; 710/260

(58) Field of Classification Search
USPC .................. 709/203, 224; 715/772, 710, 758; 716/21, 25; 710/260
See application file for complete search history.

(56) References Cited

U.S. PATENT DOCUMENTS

| | | | |
|---|---|---|---|
| 6,944,655 B1 | 9/2005 | Bellamy et al. | |
| 7,233,933 B2* | 6/2007 | Horvitz et al. | 706/21 |
| 7,424,537 B2 | 9/2008 | Bennett et al. | |
| 7,664,853 B2* | 2/2010 | Hagale et al. | 709/224 |
| 8,191,005 B2* | 5/2012 | Baier et al. | 715/771 |
| 2007/0198696 A1* | 8/2007 | Morris | 709/224 |
| 2010/0179998 A1* | 7/2010 | Matteini et al. | 709/206 |

OTHER PUBLICATIONS

Erickson, T. et al, Socially Translucent Systems: Social Proxies, Persistent Conversation, and the Design of 'Babble', Human Factors in Computing Systems: The Proceedings of CHI '99, ACM Press, May 15-20, 1999.

* cited by examiner

*Primary Examiner* — Frantz Jean
(74) *Attorney, Agent, or Firm* — Scully, Scott, Murphy & Presser, P.C.; Louis J. Percello, Esq.

(57) ABSTRACT

Interruptibility awareness service enables a requestor to learn whether a requestee is interruptible, for instance, by obtaining current social interaction information of a requestee; determining whether the requestee is interruptible based on the requestee's current social interaction information; and returning a response that indicates requestee's interruptibility.

25 Claims, 8 Drawing Sheets

Fig. 6 Visualization Option A

Fig. 7 Visualization Option B

US 8,631,119 B2

INTERRUPTIBILITY AWARENESS SERVICE

FIELD

The present disclosure generally relates to computer systems and communications among users, and more particularly to interruptibility awareness service, which, for instance, may provide whether a user may be interrupted to receive a message or the like.

BACKGROUND

Today's information and communication technology provides one with the ability to contact a given person at any time. Some of the available tools that can be used are email messaging, texting, and chatting tools. However, even if the ability to contact the person is present, it is not easy to know or determine whether or not that given person is currently interruptible.

Existing methodologies allow a given user to manually set an indication to indicate one of several states, for example, including "I am available," or "I am away," or "Do not disturb." This type of manually setting states becomes labor intensive in that the given user must constantly reset their status. Not resetting the status, for instance, for the reason that one may have forgotten to do so or was too busy to do so, often results in the user's status being incorrect. This problem is compounded if the given user's status changes frequently.

Another technique monitors the given user's computer or scheduled activity, automatically resetting the user's status. Such technique allows a user to optionally have the user's status automatically switch to "In a meeting" when the user is participating in an online meeting according to the user's scheduled activity saved in the user's computer, and switch back to "I am available" when the online meeting concludes. Although this type of technique may provide automatic status updates, it only covers a subset of needed status updates.

Further, while the laptop or computer Internet Protocol (IP) addresses and Global Positioning System (GPS) on cellular telephones may be used to determine where a given person is located, they do not tell whether the person may be interrupted.

BRIEF SUMMARY

A method and system for enabling a requestor to learn whether a requestee is interruptible are provided. The method, in one aspect, may include obtaining current social interaction information of a requestee and determining whether the requestee is interruptible based on the requestee's current social interaction information. The method further includes returning a response that indicates the requestee's interruptibility.

A system for enabling a requestor to learn whether a requestee is interruptible, in one aspect, may include a storage device operable to store current social interaction information of a requestee. A module may be operable to obtain the current social interaction information of the requestee and to determine whether the requestee is interruptible based on the requestee's current social interaction information. The module may be further operable to return a response that indicates the requestee's interruptibility.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
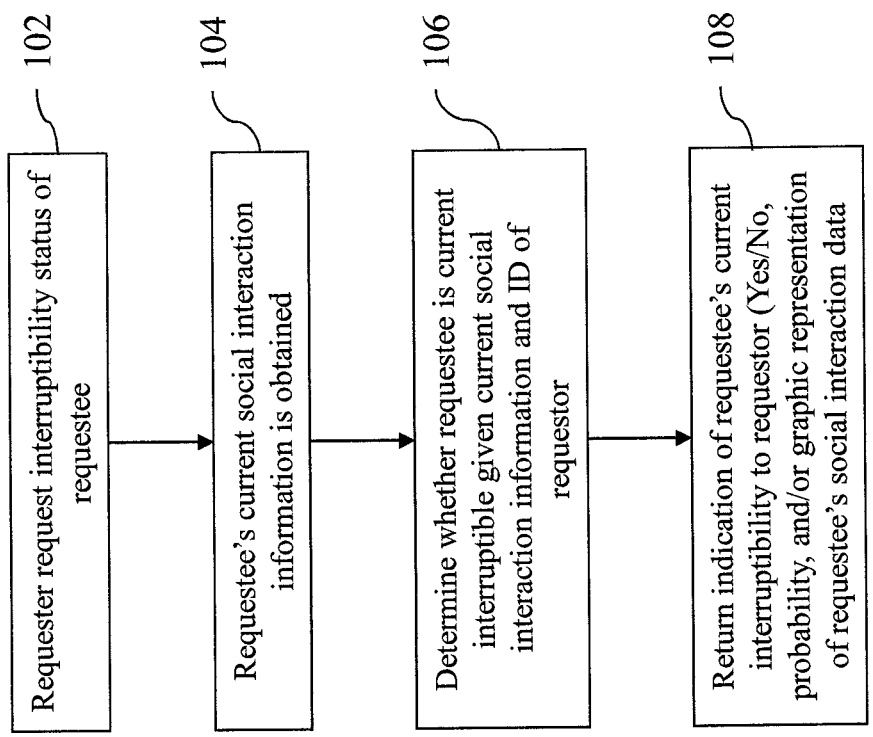
FIG. 1 is an overview of a method for interruptibility awareness in one embodiment of the present disclosure.

The present disclosure discloses a technique which allows a user to determine whether another user can be interrupted, for instance, in order to contact that another user. In this disclosure, users may be referred to as a first user, a second user, and so forth, only to denote different users. The terminologies, "first" and "second", and so forth, however, do not impart any special meaning and do not imply any order. This disclosure also uses the terminology "requestor" to refer to a person trying to learn or find out whether another person is interruptible, and "requestee" to refer to that another person whom the requestor is learning about.

In one aspect, the technique presented in the present disclosure may respond with the degree of interruptibility. For example, 0% indicates that the requestee should not be interrupted, 100% indicates that the requestee can be interrupted, 50% indicates that the requestee may be interrupted. The degree need not be represented as a percentage value as shown in this example. Rather, other degrees may be utilized, for example, ranking from a lower bound to upper bound (e.g., 1 to 10), a ratio, and others.

The determination may be made, in one aspect, using an identifier of the user, and may shield private information of the user from one another. The determination also may be based on various factors. For instance, the technique of the present disclosure in one aspect, may allow a user (referred to as a first user or requestor) looking to contact another user (referred to herein as a second user or requestee) based on:
  with whom the requestee is physically or spatially;
  with whom the requestee is communicating;
  a weighted social network (as an example, a weighted social network indicates the strength of the relationship between the requestee and each of the other people in the network. The present disclosure also utilizes context sensitive weights, for example, the strength of the weights is also dependent on or may change based on the current context of the second user. For example, for the requestee who is talking to her boss, the relationship strength may have a weight of 0.9 during working hours, but can drop to 0.5 during nonworking hours, weight being measured from 0 to 1, 0 being the lowest level of weight and 1 being the highest level of weight in this example measurement);

rules based on various factors such as the location, activity, speed of certain activities, for example, but not limited to, "do not interrupt if I am alone with upper management," "OK to interrupt if I am with lots of others", "do not interrupt if I am in washroom or upper management office", and "no calls when driving or if driving speed is faster than 5 miles per hour (MPH)";

a social network weighting algorithm based on an organization chart (for example, the strength of the relationships is determined by the hierarchy of relationships in an organizational chart. For example, the relationship strength from boss to subordinate could be 0.4 while the same relationship in the opposite direction could be strength 0.9, strength being measured from 0 to 1, 0 being the lowest level and 1 being the highest level of 1 in this example measurement. The weighting that is used is that which is relative to the requestee. For example, if the requestee is the manager and a subordinate is one of the interactors, the value 0.4 is used. Alternatively, if the requestee is the subordinate and the manager is the one of the interactors, then the weight used would be 0.9. What matters is what matters to the requestee, i.e., the weight factor indicates the requestee's availability for interruption);

history of the requestee's activities, for example, but not limited to, routine or known meeting times and places, the habitual time the requestee goes home or after work hours of the requestee, dinner time (for instance, during those times the requestee should not be interrupted, so the degree of interruptibility would be low, i.e., likely not interruptible);

location, for example, interruptible if the requestee is standing on line in cafeteria, not interruptible if the requestee seems to be rushing somewhere;

relationship structure, for example, that learned from employer organization chart;

how many people are proximal to the requestee.

Rather than using intrusive or complicated instruments to detect or determine whether a second user is interruptible, known information may be utilized to determine whether the second user is interruptible or not. Algorithms to determine interruptibility may use known information, for example, by exploiting information provided by GPS, cellular phone, relationship between a first and a second user.

In addition, a first user may set, incrementally or otherwise, information about a second user. For example, even if a user is doing exactly the same thing as another user, the interruptibility may be subjective, for example, based on who the user is. Therefore, the interruptibility may depend on both the user and the activity. A first user may be provided with the ability to add this information.

Figure 6:
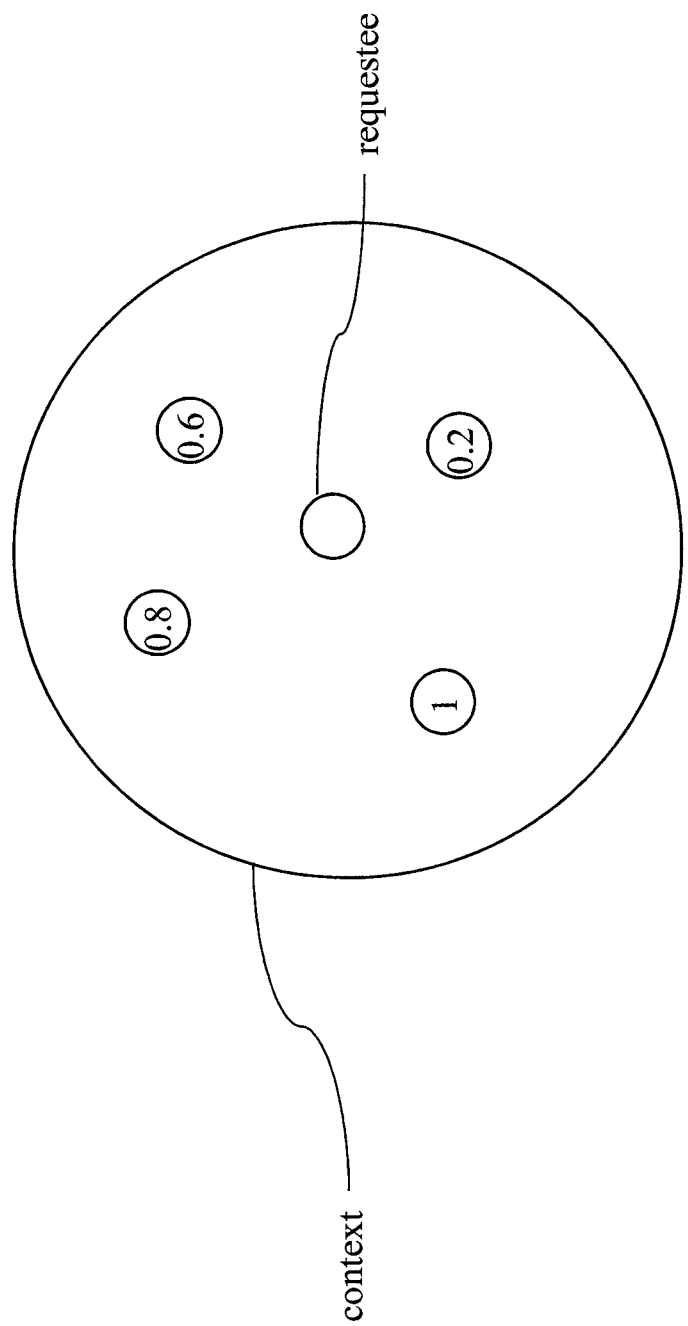
FIG. 6 shows an example of a visualization of a requestee's social interaction information in one embodiment of the present disclosure.
Figure 7:
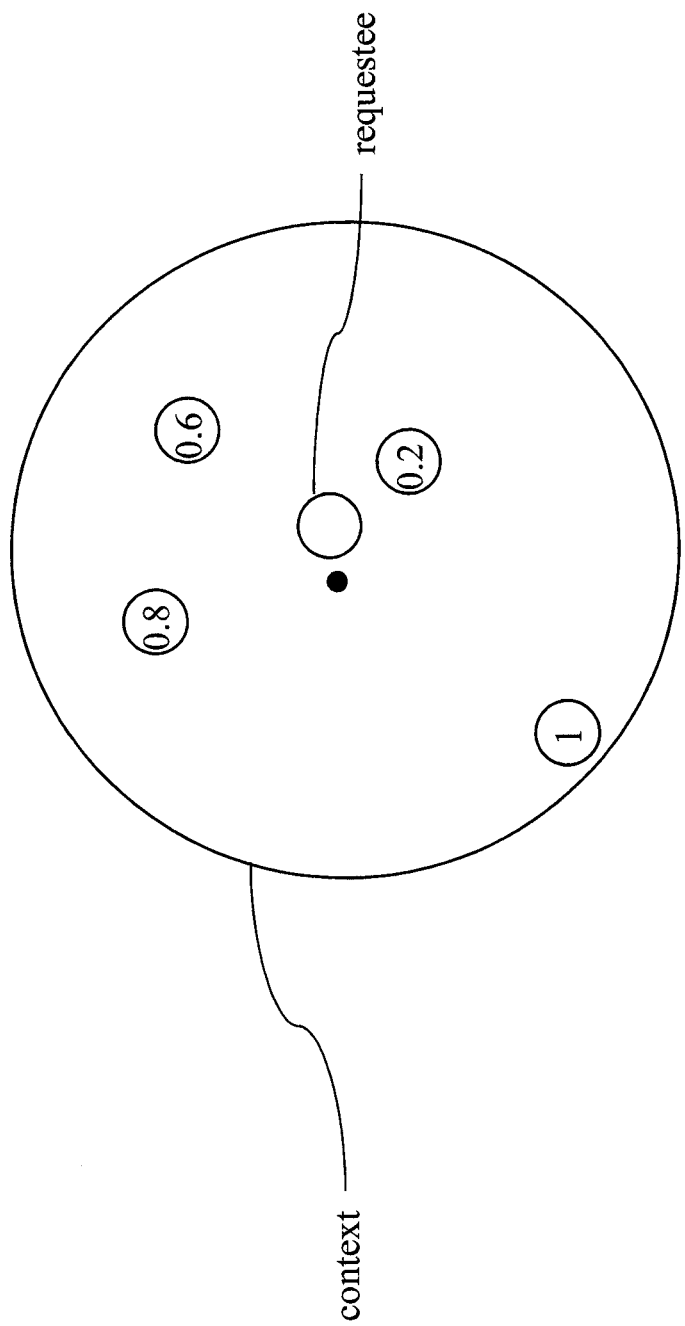
FIG. 7 shows an example of a visualization of a requestee's social interaction information in a second embodiment of the present disclosure.

The interruptibility information, for example, may be returned to a first user in the form of graphic indicating abstract. For instance, more and more information may be divulged: yes/no=>0 to 1, 1 meaning interruptible=>graphic indicating with whom a second user is interacting and level (0-1) of relationship. This graphic may also indicate a level of activity (babble-esk)). The graphic may be dynamically updated. For example, the position of representative-dots indicating the associated user's level of activity may be dynamically updated (other babble genre graphics being possible as well). For instance, FIG. 6 shows an example of a visualization of a requestee's social interaction information in one embodiment of the present disclosure. FIG. 7 shows an example of a visualization of a requestee's social interaction information in a second embodiment of the present disclosure. They are also referred to as a babble-like social proxy. Those figures show different graphics returned as a response, for example, to the requestor. The babble-like social proxy may be a lecture, a debate, or a roundtable, or the like.

In FIG. 6, Visualization option A, the requestee is represented by the small circle in the middle of the large circle, the large circle representing the context of the requestee's interaction. The other small circles represent all of the other interactors. The value inside each of the other small circles indicates the social importance or weight of the given interactor. In one embodiment of the present disclosure, this value ranges from 0 to 1, with 1 indicating the greatest social weight. Thus, as shown in the FIG. 6, there are four interactors in the context with the requestee, with weight values of 0.2 (not important), 0.6, 0.8 (both somewhat important), and 1 (critically important, e.g., CEO of requestee's company). An extension of Visualization Option A is shown in FIG. 7, Visualization Option B. Here, the figure also shows a large circle, representing the context of the interaction, which contains small circles representing the requestee (the empty circle near the middle) and all of the current interactors, the social weight of each indicated by the value is each interactors' associated circle. In addition, this figure also contains a dot directly in the center of the large circle. In this representation, the distance from the center indicates the level of activity of the associated user. Thus, since the requestee's circle is very close to the center, their level of activity is very high (e.g., they just made a post to a chat site). In contrast, the small circle containing 1 is all the way back at the edge of the large circle, indicating that the associated user has not participated recently. This graphic method of indicating activity level is similar to that of Babble described in "Socially Translucent Systems: Social Proxies, Persistent Conversation, and the Design of 'Babble.'" By T. Erickson, D. Smith, W. Kellogg, M. Laff, J. Richards, and E. Bradner, Human Factors in Computing Systems: The Proceedings of CHI '99. ACM Press, 1999.

The technique of the present disclosure may provide a user, for example, a first user with the ability to set an alert with certainty level. For example, a first user may set a profile setting that indicates if a second user's determined interruptibility is 75% or better, the first user should be notified.

FIG. 1 is an overview of a method for interruptibility awareness in one embodiment of the present disclosure. At 102, a user wanting to contact another user makes a request for the interruptibility status of said another user. For example, a user is a user of a device such as a computer, mobile phone, smartphone, and/or other devices, who desires to contact another user via that another user's device, for instance, by sending electronic mail, text messaging, chat messaging, phone call, and/or other. The user making the request is also referred to herein as a requestor. That another user whose interruptibility status is being requested is also referred to herein as a requestee. The request includes the requestor's and requestee's identifiers (IDs). Identifiers may include user names by which the users access the interruptibility awareness service or system of the present disclosure.

At 104, the requestee's current social interaction information is obtained. Such current social interaction information may include, but are not limited to: with whom the requestee is interacting; level of activity of the requestee and each interactor the requestee is interacting with; type of interaction the requestee is engaged in; role of each interactor the requestee is interacting with; location of an interaction the requestee is engaged in; location of each interactor the requestee is interacting with; speed at which the requestee is driving an automobile (e.g., if the requestee is currently driving); time of interaction the requestee is engaged in; date of interaction the requestee is engaged in; whether date of interaction the requestee is engaged in is a holiday, vacation day or another off-day or combinations thereof; or whether each interactor the requestee is interacting with is a work colleague, family member, or community or religious group member; or combinations thereof.

At 106, determination is made as to whether the requestee is currently interruptible given their current social interaction information and the social relationship of the requestor to the requestee. This determination may be based on rules. For example, Rule 1: If requestee is at home and with their family, then interruptibility=0.1

Rule 2.1: If requestee is driving and requestor is significant other, the interruptibility=0.5

Rule 2.2: If requestee is driving, then interruptibility=0.1

Rule 3.1: If requestee is in lecture, and is lecturer, then interruptibility=0.1

Rule 3.2 If requestee is in lecture but is not lecturer, the interruptibility=0.6

Rule 4.1: If requestee is involved with others whose maximum relationship weight>=0.7, then interruptibility=0.1.

Rule 4.2: If requestee is involved with others whose maximum relationship weight is less than that of requestor, then interruptibility=0.8.

Rule 4.3: If requestee is involved with others whose maximum relationship weight is greater than that of requestor, then interruptibility=1.

At 108, the indication of whether the requestee is currently interruptible or not is returned. In one aspect, the indication may be a binary value such as 0 or 1, or yes or no. In another aspect, the indication may be provided in terms of degrees, for example, percentage value or probability value indicating the likelihood that the requestee may be interrupted. Yet in another aspect, the indication may be a graphic representation of requestee's social interaction data, for example, as shown in FIGS. 6 and 7. Other measures of indications may be utilized.

Figure 2:
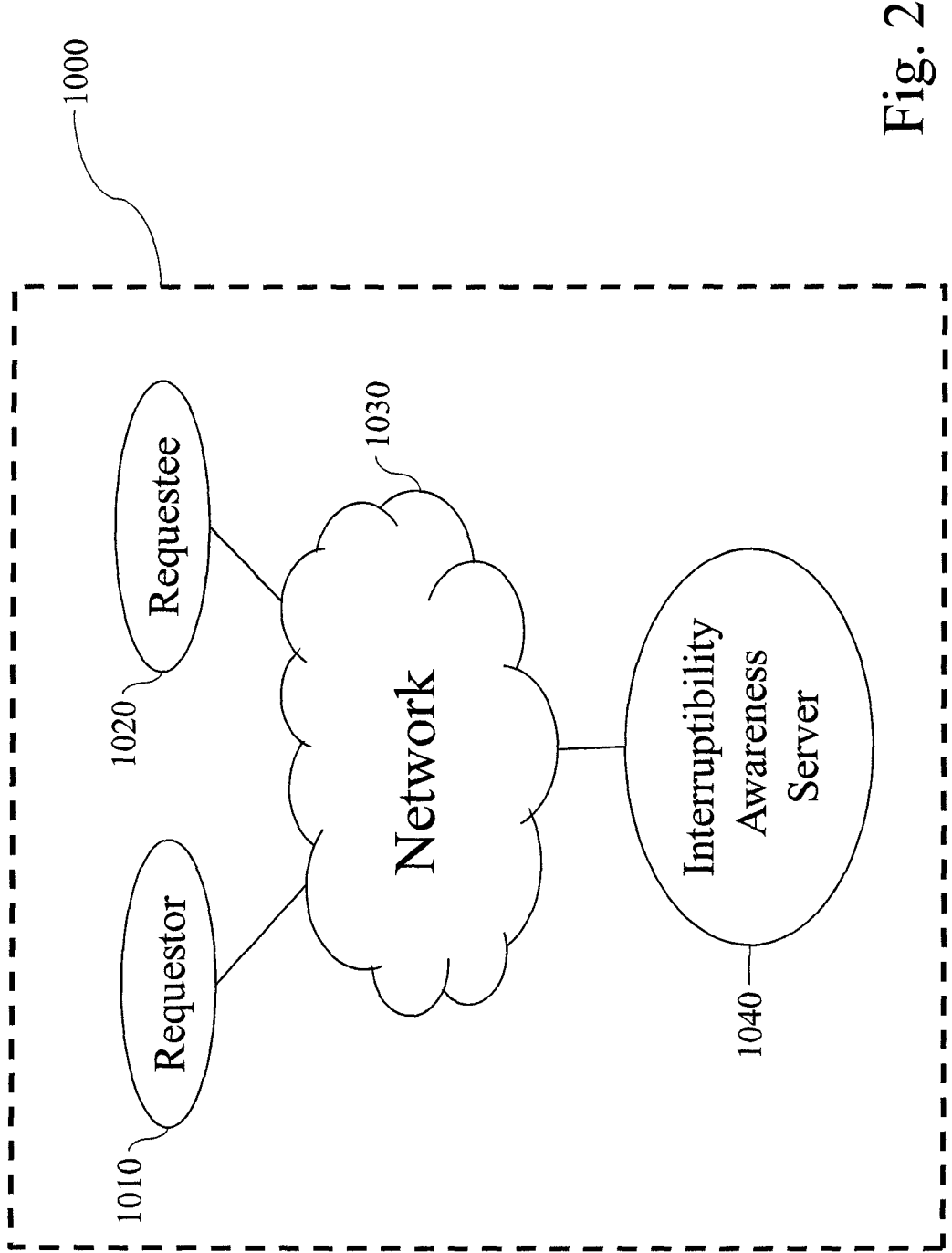
FIG. 2 is an architectural diagram illustrating network topology for interruptibility awareness in one embodiment of the present disclosure.

FIG. 2 is an architectural diagram illustrating a network topology for interruptibility awareness in one embodiment of the present disclosure. Requestor 1010 may be a user using a device such as a personal computer, laptop, netbook, mobile phone, smartphone or other devices through which the user can run a web browser, and/or send and receive messages, including but not limited to voice and/or text messages. Requestee 1020 may be another user using such devices or others that can run a web browser, and/or send and receive messages, including but not limited to voice and/or text messages. Requestor 1010 and Requestee 1020 devices communicate over a communications network 1030 such as the Internet and/or a private intranet. An interruptibility awareness server or system 1040 may be a computer system including hardware components such as one or more processors, storage devices, device drivers, network interface drivers, and programming logic and software that in conjunction provide the interruptibility awareness service of the present disclosure. The interruptibility awareness server or system 1040 may communicate to a plurality of users, e.g., one or more requestors (e.g., 1010) and requestees (e.g., 1020).

Figure 3:
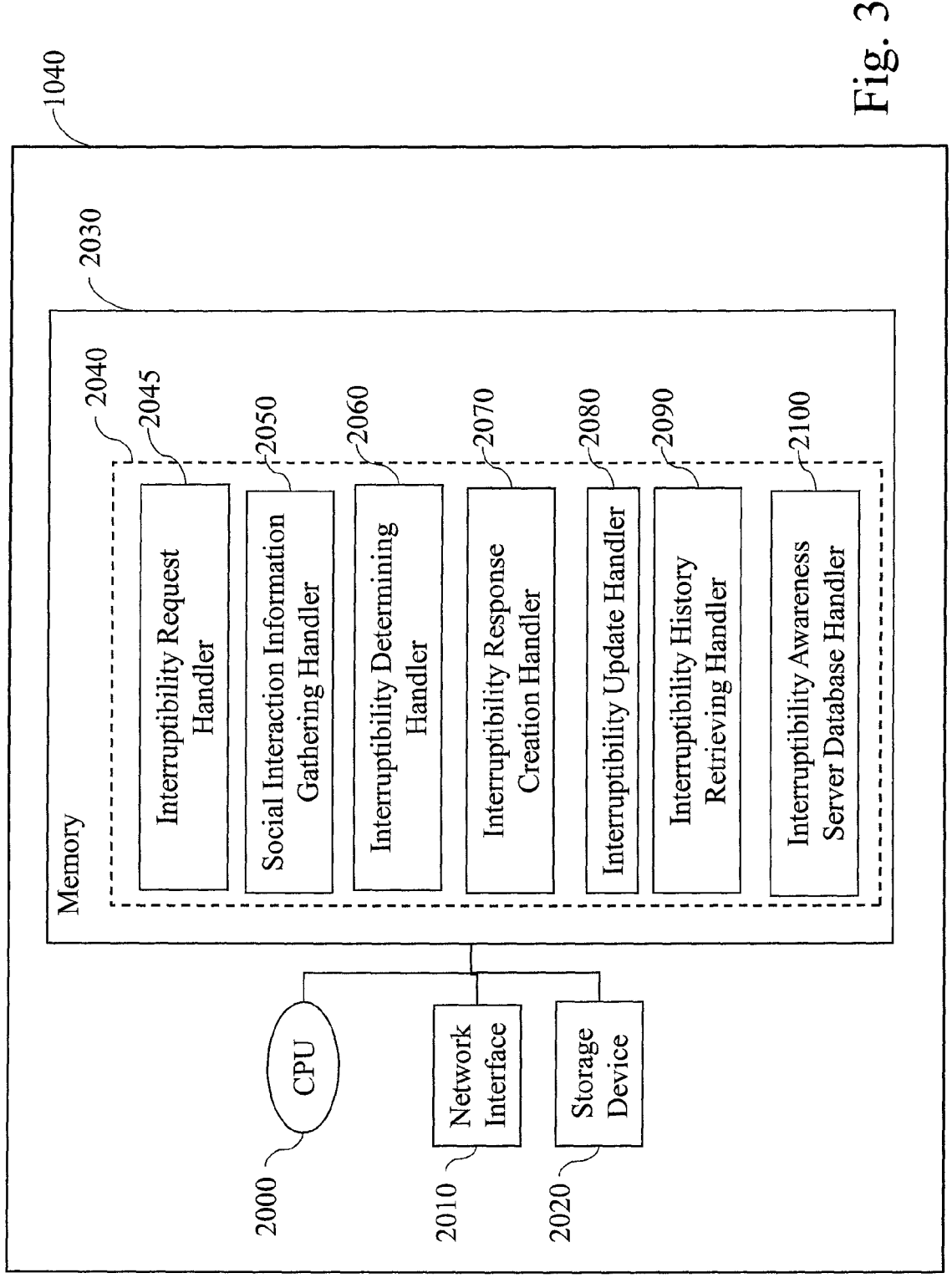
FIG. 3 is a block diagram illustrating functional components for a system that performs interruptibility awareness in one embodiment of the present disclosure.

FIG. 3 is a block diagram illustrating functional components for a system that provides interruptibility awareness in one embodiment of the present disclosure. The modules shown in FIG. 3 may be components of a computer system that may include any computing node that is able to load and execute programmatic code, for instance, running the operating system and server application suite. The system logic may be embodied as computer executable code that is loaded from a remote source (e.g., from a network file system), local permanent optical (CD-ROM), magnetic storage (such as disk), or storage 2020 into memory 2030 for execution by CPU 2000. A network interface 2010 may be used for communicating to other network accessible services. Such an interface 2010 may include, but is not limited to a hardwired device, e.g., Ethernet over coax cable, wireless IP, and telephone to IP (VoIP), or others. The memory 2030 may include computer readable instructions, data structures, program modules and application interfaces providing logic or functional components for interruptibility awareness service.

It should be understood that while FIG. 3 illustrates the functional components residing in a computer system, the system and method of the present disclosure is not limited to only that configuration. Thus, the components may be distributed over a network on different platforms in a distributed environment, and/or configured in a cloud computing environment. Further, while FIG. 3 shows a CPU 2000, the system 1040 may include multiple processors and/or cores. In addition, the system 1040 also includes a network interface 2010, including, but not limited to Ethernet or wireless IP (e.g., LEAP, CDMA or WAP); a storage device 2020, such as a disk or DASD (direct access storage device); and memory 2030, such as RAM. The network interface 2010 allows the system to communicate with other network connected nodes, such as the requestor 1010 and the requestee 1020 via the network 1030. According to one embodiment of the current invention, the Interruptibility Awareness Server's logic 2040 (which will be described in detail with reference to FIG. 4) is possibly embodied as computer executable code that is loaded from a remote source (e.g., over the network 1030), a local permanent optical CR-ROM, magnetic storage (such as disk), or from the storage device 2020 into memory 2030 for execution by the CPU 2000.

The memory 2030 may include:
an interruptibility request handler 2045, described in detail with references to FIGS. 4 and 5;
a social interaction information gathering handler 2050, described in detail with reference to FIG. 5;
an interruptibility determining handler 2060, described in detail with reference to FIG. 5;
an interruptibility response creation handler 2070, described in detail with reference to FIG. 5;
an interruptibility update handler 2080, described in detail with reference to FIG. 4;
an interruptibility history retrieving handler 2090, described in detail with reference to FIG. 4; and
an interruptibility awareness server database handler 2100.

The interruptibility awareness server database handler 2100, in one embodiment, provides for creation, deletion and modification of persistent data, and is used by the handlers 2045-2090 of the interruptibility awareness server 1040. An example of a product providing such function includes IBM DB/2™ database system.

Figure 4:
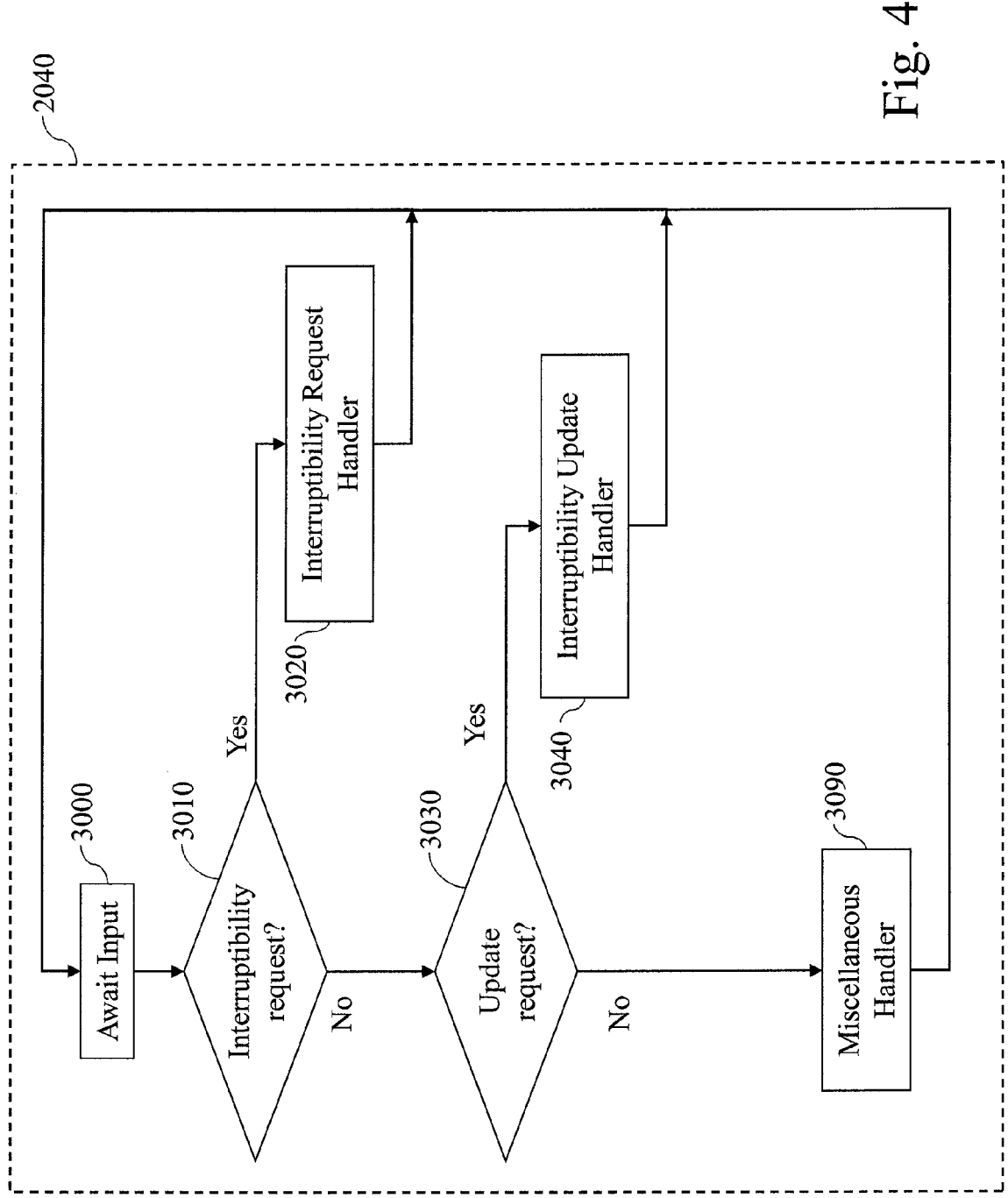
FIG. 4 is a flow diagram illustrating flow control or logic of the interruptibility awareness server or system in one embodiment of the present disclosure.

FIG. 4 is a flow diagram illustrating flow control or logic 2040 for the interruptibility awareness server or system 1040 in one embodiment of the present disclosure. At 3000, the server 1040 awaits input, for example, requests from one or more requestors to determine interruptibility of a user, e.g., a requestee. At 3010, it is determined whether the request is to determine the interruptibility of the requestee by the requestor. If so, at 3020, the interruptibility request handler 2045 (described in detail with reference to FIG. 5) is invoked, following which, control continues at step 3000. If the input is not an interruptibility request, then step 3030 checks whether the input is a request to update the interruptibility rules for the requestee. If so, then the interruptibility update handler 2080 is called in step 3040.

This interruptibility update handler 2080 allows for the updating of the interruptibility determining rules and/or other data for the requestee. These updates include, but are not limited to:

altering the concluding interruptibility measure for a given rule, e.g., changing "interruptibility=0.5" to "interruptibility=0.7" for Rule 2.1;
  copying an existing rule into a new one with a changed context, e.g., creating rule 2.3 which is a copy of 2.2 except that the context is "on vacation" rather than "at home";
  modifying a relationship specification in a given rule, e.g., modifying rule 4.1 so that "maximum relationship weight=0.9" rather than just "maximum relationship weight=0.7";
  altering the relationship weight of a given user, e.g., changing the weight of the user given a weight of 1 in FIG. 6 to 0.8.

The requestor may also customize one or more weightings of the requestee's current social interactions, for example, by requesting a history of their interruptibility requests for a given requestee. The system and/or method of the present disclosure may present the requestor with a list of the interruptibility requests that were made and corresponding responses. The requestor may suggest changes to the data indicated in the provided one or more responses (e.g., suggest modified weights for one or more of the interactors). Those changes may be stored and used in future interruptibility requests for the requestee from the given requestor.

A requestee may be enabled to customize the weightings of interactors in their own social interactions. For example, the requestee may specify one or more requestors, wherein history of requests from the specified one or more requestors and associated responses are provided to the requestee. The requestee may modify the associated responses, wherein the modified responses are used in future interruptibility determinations for one or more requests from the specified one or more requestors. The requestee may also specify the role of one or more interactors whom the requestee is interacting with.

In one embodiment, to allow a given user to make these modifications, the handler passes the ID of the requestee as well as the requestor when it is invoked. Once all additions and alterations have been completed, the user indicates "save" and the handler stores the updated rules using the interruptibility awareness server database handler 2100. To alter rules for a different requestee/requestor pair of users, the handler 2080, is invoked with the new pair.

In one aspect, the determined interruptibility responses may be saved or stored for future reference or use, as well as being provided to the requestor at the time of the request. A user, for instance, may be able to retrieve a history of responses. For example, in order to obtain a history of interruptibility responses for a given requestee/requestor user pair, the interruptibility update handler 2080, allows a user to request this information using the interruptibility history retrieving handler 2090. This handler 2090 takes a given requestee/requestor pair of user ID's and returns a history of the responses for the pair, retrieving the information from the interruptibility awareness server database handler 2100. The information provided includes not only each response (i.e., the 0-1 estimate of the requestee's interruptibility by the requestor) but also indication of the requestee's social interaction information at the time of the response.

Following the execution of the interruptibility update handler 2080, control continues at step 3000.

At 3090, if the input is not an interruptibility request and the input is not an update request, the flow control continues to miscellaneous handler for handling the input appropriately, following which control continues at step 3000.

Figure 5:
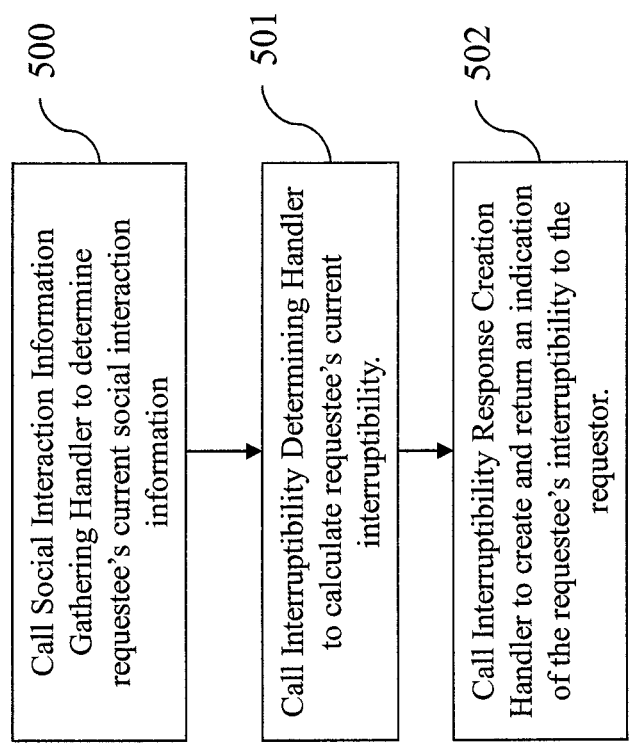
FIG. 5 is a flow diagram illustrating flow control of the interruptibility request handler in one embodiment of the present disclosure.

FIG. 5 shows the logic flow of the interruptibility request handler 2045 in one embodiment. This handler 2045, which is passed the ID's of both the requestee and requestor determines the interruptibility of the requestee by the requestor, returning an indication of this determination to the requestor. As shown, to determine the requestee's interruptibility, the interruptibility request handler 2045 obtains the current social interaction information for the requestee (i.e., what they are doing and with whom) using the social interaction information gathering handler 2050 in step 500. One way for the handler 2050 to obtain this information may be from a chat server, e.g., where the requestee and requestor are active, as well as the ID's of any of interactors (e.g., chat participants). Another source of context information may be the GPS information provided by one or more of the requestee's devices (e.g., a cellular phone, like Apple's iPhone). Such information would include not only the requestee location (geographic, e.g., U.S. or another country, as well as "home" or "office"), but also may provide their speed. E.g., (in miles/hour):

0—not moving,
  3—walking,
  50—driving
  250—flying

Yet another source of interaction information may be the requestee's calendar which may indicate such data as:

work time (e.g., 9 AM-5 PM Monday-Friday),
  personal time (e.g., time during the week other than work time),
  holidays,
  meetings, and
  lectures/presentations Note that in addition to providing this schedule of events, the requestee's calendar could also provide a list of the attendees of one or more of the event (e.g., attendees of a given meeting, or the speaker at a given lecture, this speaker possibly being the requestee).

Once obtained, the interruptibility determining handler 2060 stores all of this social interaction data in a new request entry using the interruptibility awareness server database handler 2100.

The information retrieval also includes the determination of the social weights for each of the interactors (e.g., searching for and retrieving them from the interruptibility awareness server database handler 2100). The determination of social weights could also be calculated using the data from an organization chart. E.g., when a given interactor (including the requestor) is on the same organization chart level as the requestee, the interactor's social weight would be 0.5. If the interactor is on a higher organization chart level than the requestee, their social weight may be calculated to be the default, 0.5, incremented by 0.1 for the difference in org chart levels, this incrementation proceeding up to a maximum of 1.

E.g. if the requestee is on level 3 and the interactor is on level 1, the interactor's social weight would be calculated to be 0.7:

$$0.5+((3-1)*0.1)=$$

$$0.5+(2*0.1)=$$

$$0.5+0.2=$$

$$0.7$$

Similarly, if the interactor is on a lower organization level, the default value (e.g., 0.5) is decremented by 0.1 for the difference in the number of levels, this decrementation proceeding to a minimum value of 0. E.g., if the requestee is on level 3 of the organization chart while the interactor is on level 5, the interactor's social weight would be calculated to be 0.3:

$$0.5-((5-3)*0.1)=$$

$$0.5-(2*0.1)=$$

$$0.5-0.2=$$

$$0.3$$

In the above examples, low number level indicates higher status in the organization chart. Any and all calculated social weights are stored, including but not limited to adding this data to the new entry for the current request using the interruptibility awareness server database handler 2100.

Next, in step 501, the interruptibility determining handler 2060 is called to determine an estimate of whether the requestor can interrupt the requestee, this handler being passed the id's of the requestee and the requestor as well the requestee's social interaction information just obtained. The interruptibility determining handler 2060 then retrieves the interruptibility determining rules for the requestee and, where relevant, the requestor, from the interruptibility awareness server database handler 2100. The handler then calculates the requestee's interruptibility by using the requestee's current social interaction information along with the interruptibility rules for the requestee. Note that the weights for each of the interactors can be dependent of the current context. E.g., a manager might have a weight of 0.9 during work hours, but only a weight of 0.2 during weekends. These alterations can be included with the requestee interruptibility rules (i.e., a given rule can indicate that a manager has a weight of 0.9 during work hours, but only 0.2 during weekends).

Once calculated, and stored in the relevant request entry using the interruptibility awareness server database handler 2100, the social interaction information and interruptibility estimate are passed to the interruptibility response creation handler 2070 in step 502. This handler 2070 creates and returns the interruptibility estimate to the requestor. In one embodiment of the present disclosure, this response is an applet returned to the requestor's web client, the applet first simply displaying "yes" of "no" depending on whether the estimate value is greater than 0.5 (e.g., "yes" if the value is greater than or equal to 0.5, "no" if less than 0.5). The applet may also provide a button or the like functionality, e.g., labeled "details," which if selected causes the applet to display the actual numeric value of the interruptibility estimate.

There also may be a button or the like functionality labeled, e.g., "interaction information" which if selected displays a visualization of the requestee's current social interaction information (two embodiments of such visualizations described in detail with reference to FIGS. 6 and 7). A requestee may control which requestors are able to have such a visualization revealed.

Further, a graph such as those shown in FIGS. 6 and 7 may have a node representing the requestee in the center of the graph, with one or more other nodes representing one or more interactors with whom the requestee is currently interacting. The distance or length between the requestee node and an interactor node may represent the length of time elapsed since the interactor's last activity. Each node may provide indication of the associated user's role. For example, by hovering a mouse or another pointing device over the node, a role of the user or interactor associated with or represented by the hovered-over node may be displayed as a pop-up or the like.

In another aspect, the response is provided as a babble-like social proxy such as those shown in FIG. 6 and FIG. 7, wherein a large circle represents current interaction context. A plurality of smaller circles located in the circle represents a requestee and one or more interactors. For example, one of the plurality of smaller circles represents the requestee, and the rest of the plurality of smaller circles represents one or more interactors in the current interaction context, social proxy such as a lecture, roundtable, or others. Each of the rest of the plurality of smaller circles representing one or more interactors in the current interaction context, is associated with a number indicating importance of associated interactor to the requestee. Each of the rest of the plurality of smaller circles representing one or more interactors in the current interaction context is positioned in the circle so that its distance from the center of the circle indicates how recently the associated interactor was active in the current interaction context.

In yet another aspect, the system and/or method of the present disclosure may enable the requestor to provide feedback information regarding the response. For instance, the requestor may be prompted to enter such feedback. The feedback information may include at least whether or not the requestee was actually interruptible. The requestee also may be enabled to provide feedback regarding the returned response, for instance, whether or not the requestee was actually interruptible. This feedback information may be also saved or stored, for instance, in the interruptibility awareness server database handler 2100, and used in future interruptibility determinations for the requestee.

For instance, the interruptibility awareness service of the present disclosure may use this feedback in future interruptibility determinations for the given requestee. For example, even though the service said the requestee was interruptible given a particular set of social interaction data, it turned out that the requestee was not interruptible. Given this information, the requestor (or the requestee) later indicates to the interruptibility awareness service (e.g., via a web interface) that it was the presence of one particular interactor (e.g., 3rd line manager) that was not given sufficient weight or importance. The interruptibility awareness service 1040 records this piece of information using the interruptibility awareness server database handler 2100 and uses it in subsequent interruptibility determinations for the given requestee.

Still yet in another aspect, the system 1040 and/or method of the present disclosure may enable the requestor to get alerted when the requestee becomes available. For example, the requestor may be enabled to indicate a threshold value of interruptibility for getting alerted. The threshold value may be stored. As an example, the threshold value may be set by the requestor specifying a threshold interruptibility level above which they should be notified, e.g., 70%. The system 1040 and/or method of the present disclosure may automatically and periodically recheck the requestee's interruptibility, and return the requestee's interruptibility when the threshold value is met.

Further, a follow up request may be automatically executed. For example, the requestor may indicate that follow up request be made after the initial or previous request(s), for instance, providing the period or time for making the follow up request. The system 1040 and/or method of the present disclosure may then automatically recheck requestee's interruptibility according to the follow up request, and return the status to the requestor. The follow up request may include the specification of a delay. In another aspect, a default time delay may be used, after which a follow up request to determine the interruptibility status of the specified requestee is performed automatically.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 8:
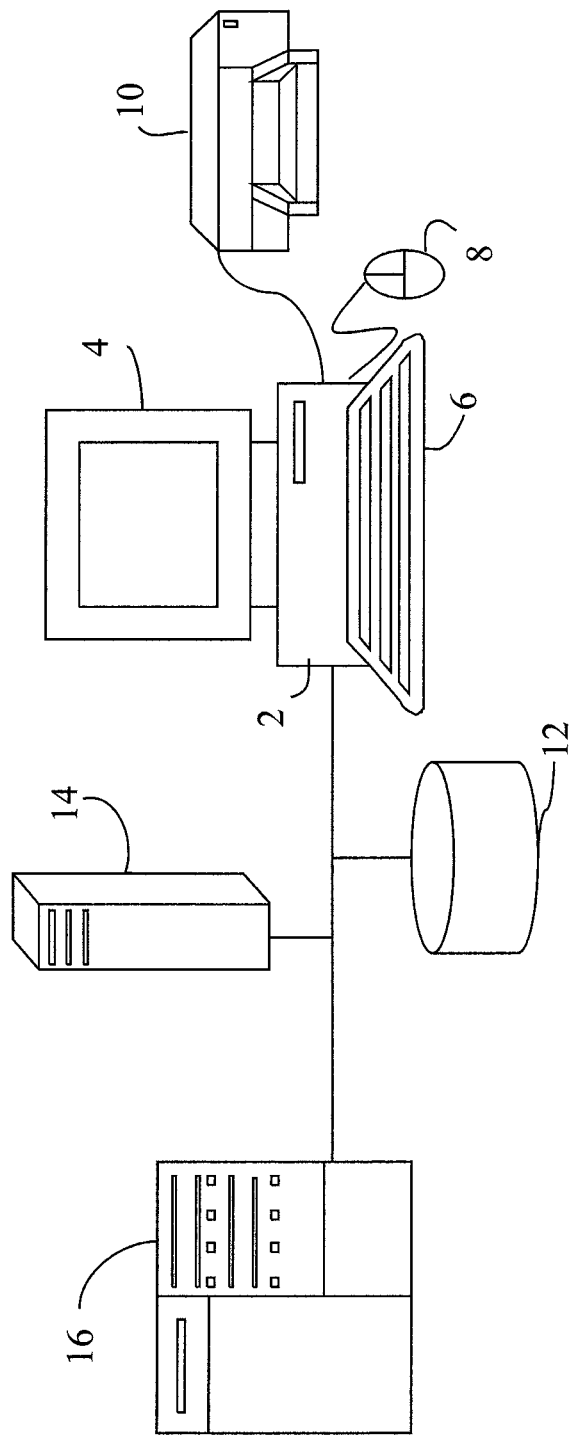
FIG. 8 illustrates an example of a computer system, in which the systems and methodologies of the present disclosure may be carried out or executed.

Referring now to FIG. 8, the systems and methodologies of the present disclosure may be carried out or executed in a computer system that includes a processing unit 2, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit 2 by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 4 for presenting output displays and providing a display through which the user may input data and interact with the processing system, for instance, in cooperation with input devices such as the keyboard 6 and mouse device 8 or pointing device. The computer processing system may be also connected or coupled to one or more peripheral devices such as the printer 10, scanner (not shown), speaker, and any other devices, directly or via remote connections. The computer processing system may be connected or coupled to one or more other processing systems such as a server 10, other remote computer processing system 14, network storage devices 12, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 2, 14, 16), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of enabling a requestor to learn whether a requestee is interruptible, comprising:
    obtaining, using a processor, current social interaction information of a requestee;
    determining whether the requestee is interruptible based on the requestee's current social interaction information;
    returning a response that indicates the requestee's interruptibility,
    the determining utilizing at least a weighted social network and context sensitive weights that change based on current context of the requestee.

2. The method of claim 1, wherein the requestee's current social interaction information includes one or more of:
    who the requestee is interacting with;
    level of activity of the requestee and each interactor the requestee is interacting with;
    type of interaction the requestee is engaged in;
    role of each interactor the requestee is interacting with;
    location of an interaction the requestee is engaged in;
    location of each interactor the requestee is interacting with;
    speed at which the requestee is driving an automobile;
    time of interaction the requestee is engaged in;
    date of interaction the requestee is engaged in;
    whether date of interaction the requestee is engaged in is a holiday, vacation day or combinations thereof; or whether each interactor the requestee is interacting with is work colleague, family member, or community or religious group member; or
combinations thereof.

3. The method of claim 2, wherein a role of an interactor which the requestee is interacting with is retrieved from an organization chart or organization directory or combinations thereof.

4. The method of claim 3, wherein the role further includes management information obtained from the organization chart or organization directory or combinations there.

5. The method of claim 2, wherein a role of an interactor which the requestee is interacting with is specified by the requestee.

6. The method of claim 1, wherein the response includes on or more of:
   binary value;
   probability value;
   babble-like social proxy; or
   combinations thereof.

7. The method of claim 6, wherein the response is first provided to the requestor as binary value, and the requestor is given an option to additionally get the response as probability value.

8. The method of claim 7, wherein the requestor is further enabled to select to have babble-like social proxy revealed from the response.

9. The method of claim 8, wherein the requestee can control which requestors are able to have the babble-like social proxy revealed.

10. The method of claim 1, wherein the determining step uses one or more rules based on the requestee's current social interaction information.

11. The method of claim 1, wherein the response is a graphic visualization that includes:
    a circle representing current interaction context,
    a first smaller circle located in the middle of the circle, the first smaller circle representing the requestee, and
    one or more second smaller circles positioned in the larger circle, each second smaller circle representing an interactor in current interaction, and each second smaller circle associated with a number which indicates the importance of the associated interactor to the requestee.

12. The method of claim 11, wherein each node in the babble-like social proxy includes an indication of contribution of a user associated with said each node to interruptibility determination.

13. The method of claim 11, wherein each node in the babble-like social proxy includes indication of a role of a user associated with said each node.

14. The method of claim 1, wherein the response is provided as a babble-like social proxy, the babble-like social proxy including:
    a circle that represents current interaction context;
    a plurality of smaller circles located in the circle;
    one of the plurality of smaller circles representing the requestee, rest of the plurality of smaller circles representing one or more interactors in the current interaction context;
    the rest of the plurality of smaller circles representing one or more interactors in the current interaction context each associated with a number indicating importance of associated interactor to the requestee;
    the rest of the plurality of smaller circles representing one or more interactors in the current interaction context each positioned in the circle so that its distance from the center of the circle indicates how recently the associated interactor was active in the current context.

15. The method of claim 1, further including:
    enabling the requestor to provide feedback regarding the response, the feedback including at least whether or not the requestee was actually interruptible; and
    using the feedback in future interruptibility determinations for the requestee.

16. The method of claim 1, further including:
    enabling the requestor to customize one or more weightings of the requestee's current social interactions, by at least allowing:
    the requestor to request a history of their interruptibility requests for a given requestee;
    the requestor being presented with a list of the interruptibility requests that were made and corresponding responses;
    the requestor suggesting changes to data indicated in the response, the changes to the data for use in future interruptibility requests for the requestee from given requestor.

17. The method of claim 1, further including:
    enabling the requestee to provide feedback regarding the returned response, the feedback including at least whether or not the requestee was actually interruptible; and
    using the feedback in future interruptibility determinations for the requestee.

18. The method of claim 1, further including:
    enabling the requestee to customize the weightings of interactors in their own social interactions.

19. The method of claim 18, further including:
    enabling the requestee to customize the weightings of the requestee's current social interactions, by at least allowing:
    the requestee to specify one or more requestors, wherein history of requests from the specified one or more requestors and associated responses are provided to the requestee; and allowing the requestee to modify said associated responses, wherein the modified responses are used in future interruptibility determinations for one or more requests from the specified one or more requestors.

20. The method of claim 1, further including:
    enabling the requestor to get alerted when the requestee becomes available, wherein the step of enabling the requestor to get alerted includes:
    allowing the requestor to indicate a threshold value of interruptibility for getting alerted;
    automatically and periodically rechecking requestee's interruptibility, and returning the requestee's interruptibility when the threshold value is met.

21. The method of claim 1, further including:
    enabling the requestor to have a follow up request automatically executed, the enabling the requestor to have a follow up request automatically executed including:
    allowing the requestor to indicate that follow up request to be made;
    automatically rechecking requestee's interruptibility according to the follow up request; and
    returning status to the requestor.

22. A system for enabling a requestor to learn whether a requestee is interruptible, comprising:
    a processor;
    a storage device operable to store current social interaction information of a requestee; and a module operable to obtain, using the processor, the current social interaction information of the requestee, further operable to determine whether the requestee is interruptible based on the requestee's current social interaction information, the module further operable to return a response that indicates requestee's interruptibility, wherein the module determines the requestee's interruptibility utilizing at least a weighted social network and context sensitive weights that change based on current context of the requestee.

23. The system of claim 22, wherein the requestee's current social interaction information includes one or more of:
whom the requestee is interacting with;
level of activity of the requestee and each interactor the requestee is interacting with;
type of interaction the requestee is engaged in;
role of each interactor the requestee is interacting with;
location of an interaction the requestee is engaged in;
location of each interactor the requestee is interacting with;
speed at which the requestee is driving an automobile;
time of interaction the requestee is engaged in;
date of interaction the requestee is engaged in;
whether date of interaction the requestee is engaged in is a holiday, vacation day or combinations thereof; or
whether each interactor the requestee is interacting with is work colleague, family member, or community or religious group member; or
combinations thereof.

24. A computer readable storage device storing a program of instructions executable by a machine to perform a method of enabling a requestor to learn whether a requestee is interruptible, comprising:

obtaining current social interaction information of a requestee;
determining whether the requestee is interruptible based on the requestee's current social interaction information; and
returning a response that indicates requestee's interruptibility,
the determining utilizing at least a weighted social network and context sensitive weights that change based on current context of the requestee.

25. The computer readable storage device of claim 24, wherein the requestee's current social interaction information includes one or more of:
whom the requestee is interacting with;
level of activity of the requestee and each interactor the requestee is interacting with;
type of interaction the requestee is engaged in;
role of each interactor the requestee is interacting with;
location of an interaction the requestee is engaged in;
location of each interactor the requestee is interacting with;
speed at which the requestee is driving an automobile;
time of interaction the requestee is engaged in;
date of interaction the requestee is engaged in;
whether date of interaction the requestee is engaged in is a holiday, vacation day or combinations thereof; or
whether each interactor the requestee is interacting with is work colleague, family member, or community or religious group member; or
combinations thereof.

* * * * *